(12) United States Patent
Igarashi et al.

(10) Patent No.: US 6,299,797 B1
(45) Date of Patent: Oct. 9, 2001

(54) FLUORESCENT MATERIAL AND MANUFACTURING METHOD THEREFOR

(75) Inventors: Takahiro Igarashi; Masaru Ihara; Tsuneo Kusunoki, all of Kanagawa; Katsutoshi Ohno, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/564,705

(22) Filed: May 4, 2000

(30) Foreign Application Priority Data

Dec. 5, 1999 (JP) .................................................. 11-131728

(51) Int. Cl.$^7$ ...................................................... C07K 11/78
(52) U.S. Cl. ............................ 252/301.4 R; 252/301.6 R
(58) Field of Search ...................................... 252/301.4 R

(56) References Cited

U.S. PATENT DOCUMENTS 6,048,469 * 4/2000 Xiang et al. ................... 252/301.4 R

OTHER PUBLICATIONS

Chemical Abstracts citation 1973–411264: abstract for JP 47019525 B4, Jun. 3, 1972.*

* cited by examiner

*Primary Examiner*—C. Melissa Koslow
(74) *Attorney, Agent, or Firm*—Ronald P. Kananen; Rader, Fishman & Grauer

(57) ABSTRACT

A fluorescent material is disclosed which is excellent in the intensity of color and brightness and suitable for a FED and a precise CRT. The fluorescent material is prepared by co-activating yttrium oxide fluorescent material activated with europium. The means particle size is 10 nm to 100 nm. To prepare the fluorescent material, basic carbonate activated with europium and zinc is used as a precursor which is then baked. The precursor is prepared by a liquid-phase reaction. Specifically, yttrium nitrate, europium nitrate and zinc acetate are allowed to react in a solution together with sodium carbonate. The prepared precursor is baked by a quick heating and cooling As an alternative to this, the precursor is baked together with flux (phosphate of alkali metal).

8 Claims, 2 Drawing Sheets

FLUORESCENT MATERIAL AND MANUFACTURING METHOD THEREFOR

BACKGROUND OF THE INVENTION

1. Field of the Invention

The present invention relates to a fluorescent material for use in, for example, a field emission display (FED) and a manufacturing method therefor, and more particularly to an improvement in a yttrium oxide fluorescent material activated with europium.

2. Description of the Related Art

Particles of a yttrium oxide fluorescent material activated with europium (Eu)($Y_2O_3$:Eu) are mainly prepared by two methods. That is, a method is employed with which powder of a yttrium oxide and powder of an europium oxide are mixed with each other by a ball mill. Then, powder of the mixed materials is baked. Another method has the step of dissolving powder of the yttrium oxide and powder of the europium oxide by using nitric acid. Then, the materials are co-precipitated as an oxalate which is then baked.

The latter method is an advantageous method which permits a fluorescent material excellent in light emitting efficiency to be obtained.

A variety of fluorescent materials are employed in displays of television receivers. Usually, the particle of the fluorescent material is several $\mu$m (3 $\mu$m to 10 $\mu$m).

In recent years, a variety of display units have been developed. From a viewpoint of reducing the thickness of the display, a plasma display (PDP), a field emission display (FED) and an electro-luminescence display (ELD) have attracted attention.

The structure of the FED cannot raise the accelerated voltage. Thus, there arises a problem in that the fluorescent material having a particle size of about several $\mu$m for use in the conventional CRT cannot sufficiently perform excitation. The reason for this lies in that the low acceleration voltage cannot enable electron beams to reach portions at which particles emit light.

Therefore, a nano-crystal fluorescent material having a nano particle size has been studied.

The nano-crystal fluorescent material is able to raise the probability of existence of light emitting portions adjacent to the surfaces of the particles. Thus, excitation is permitted even at the low acceleration voltage. That is, the nano-crystal fluorescent material is suitable for a fluorescent material for the FED unit.

For example, the FED unit can be excited at the low acceleration voltage as described above. Therefore, the distance for which electron beams are introduced is too short to sufficiently excite the FED by the fluorescent material particles each having the particle size of several $\mu$m.

Therefore, a fine nano-crystal fluorescent material suitable for the FED and precise CRT has been required.

Under the foregoing circumstances, the applicant of the present invention has disclosed a method of preparing nano-crystal fluorescent material of the yttrium oxide having europium by using liquid-phase reactions.

The yttrium oxide fluorescent material activated with europium ($Y_2O_3$:Eu) has a problem of unsatisfactorily low intensity of color (chromaticity). To raise the intensity of color (that is, to raise the chromaticity), the concentration of Eu must be raised. When the concentration of Eu is raised, the transaction of Eu results in the brightness being lowered (the foregoing phenomenon is called "concentration extinction").

Therefore, the yttrium oxide fluorescent material activated with europium ($Y_2O_3$:Eu) is not permitted to raise the concentration of Eu to improve the intensity of color. Thus, improvement of the foregoing problem is an important factor. Also raising of the brightness is required.

SUMMARY OF THE INVENTION

In view of the foregoing, an object of the present invention is to provide a fluorescent material having excellent characteristics including the intensity of colors and brightness and suitable for a FED and a precise CRT and a manufacturing method thereof.

To achieve the foregoing object, according to one aspect of the present invention, there is provided a fluorescent material comprising: a yttrium oxide fluorescent material activated with europium, wherein the yttrium oxide fluorescent material is co-activated with zinc.

According to another aspect of the present invention, there is provided a method of manufacturing a fluorescent material comprising the steps of: using basic carbonate activated with europium and zinc as a precursor; and baking the precursor to prepare a yttrium oxide fluorescent material activated with europium and zinc.

The fluorescent material according to the present invention is prepared by bringing zinc into a solid solution state (a state in which zinc is uniformly introduced at the atom level) when a substance (the precursor) to be baked is prepared. The precursor is baked so that a fluorescent material is prepared. The obtained fluorescent material is in a state where zinc is uniformly dissolved in a yttrium oxide fluorescent material activated with europium ($Y_2O_3$:Eu) at the atom level. Thus, the color intensity and the brightness can considerably be improved.

The mainstream of the fluorescent material for use in a FED is a sulfide fluorescent material, such as ZnS:Cu, Al, ZnS:Ag or Al, $Y_2O_2S$:Eu. The foregoing sulfide fluorescent materials easily deteriorate and suffer from short lifetime.

Therefore, an oxide fluorescent material has attracted attention. As a red fluorescent material, the yttrium oxide fluorescent material activated with europium ($Y_2O_3$:Eu) is known. The developed color is distinct from red, that is, orange-like color is developed. To develop satisfactory red level (to raise the intensity), the concentration of Eu must be raised. In this case, the brightness is, however, lowered.

The present invention is structured to bring zinc into a solid solution state so that the intensity of color is raised without lowering of the brightness.

The manufacturing method is structured to use basic carbonate as the precursor. The basic carbonate is a low-cost material which can easily be handled. When the precursor is prepared by, for example, a liquid phase reaction, particles having a mean particle size of about tens of nm can be prepared. As an alternative to this, flux (a fusing agent) is employed to permit raising of the baking temperature. Thus, micron-size fluorescent material can be prepared.

Other objects, features and advantages of the invention will be evident from the following detailed description of the preferred embodiments described in conjunction with the attached drawings.

DETAILED DESCRIPTION OF THE PREFERRED EMBODIMENTS

Figure 1:
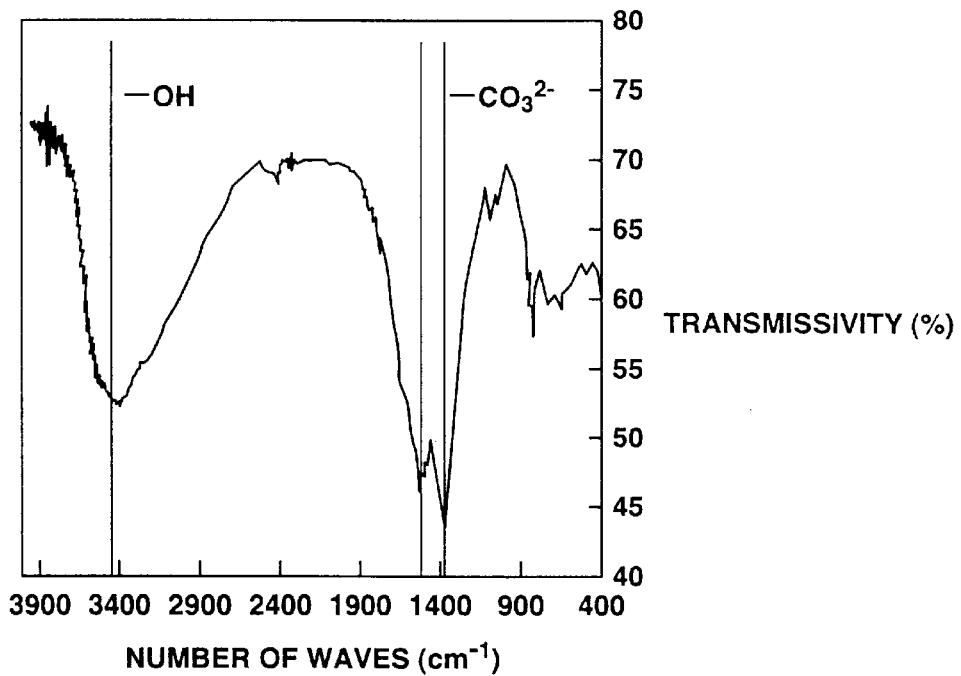
FIG. 1 is a graph showing results of analysis of Fourier transformation infrared spectral (FT-IR) of basic carbonate yttrium activated with Eu and Zn.

A fluorescent material and a manufacturing method therefor according to the present invention will now be described.

The fluorescent material according to the present invention has a structure that a yttrium oxide fluorescent material activated with europium is co-activated with zinc. The fluorescent material according to the present invention is expressed as $Y_2O_3$:Eu, Zn.

The fluorescent material according to the present invention is uniformly dissolved in the yttrium oxide fluorescent material activated with europium ($Y_2O_3$:Eu) at the atom level. Thus, the intensity of the color and brightness can considerably be improved.

The particle size of the fluorescent material may be determined to meet a purpose. When the fluorescent material according to the present invention is used in, for example, a FED, it is preferable that the mean particle size is 10 nm to 100 nm (a so-called nano-size). When the fluorescent material according to the present invention is employed in a precise CRT or the like, the mean particle size is made to be several μm (3 μm to 10 μm).

The fluorescent material according to the present invention is prepared as follows: a precursor to which Eu and Zn have been doped is obtained by a liquid-phase reaction. A baking method different from a usual method is employed to prepare nano-size $Y_2O_3$:Eu, Zn fluorescent material particles.

To fine the obtained particles, it is preferable that a substance having a low transition temperature to yttrium oxide is employed as the precursor. Therefore, basic yttrium carbonate $[Y_2(CO_3).nY(OH)_3]$ having a low transition temperature to an oxide is prepared as the precursor.

Therefore, a sol-gel method or a hydrothermal synthesis which cannot easily be performed has been employed to prepare basic yttrium carbonate. On the other hand, the present invention is structured such that sodium carbonate which is a low-cost material and which can easily be handled is employed to prepare the basic yttrium carbonate having Eu and Zn doped thereto. Since Eu is doped by co-precipitation in a liquid phase, uniform solid solution at the atom level can be realized.

For example, the liquid phase reaction is performed such that yttrium nitrate, europium nitrate and zinc acetate are allowed to react in a solution. Thus, the basic carbonate activated with europium and zinc can be prepared as the precursor.

Specifically, the liquid phase reaction for preparing the precursor is as follows:

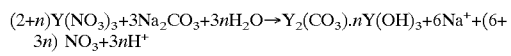

The obtained precursor is baked so that the fluorescent material is obtained. In the present invention, the baking particle is devised. A usual baking program is arranged such that the temperature is raised from the room temperature to a required temperature. Then, the raised temperature is maintained, and then decrease in the temperature to the room temperature is waited for. During increase and decrease in the temperature, particles are undesirably grown. Therefore, a quick heating and cooling method is employed in the present invention. The foregoing method has the steps of introducing a material at a required temperature; maintaining the temperature; and instantaneously restoring the temperature to the room temperature. The foregoing method is able to make the mean particle size of the obtained fluorescent material to be about tens of nm.

A solid phase reaction realized by baking is as follows. Since the quantities of Eu and Zn are small, the two types of elements are omitted from the formula.

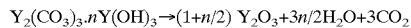

Although nitrate is employed in the foregoing method, acetate or sulphate may be employed.

When basic yttrium carbonate to which Eu and Zn have been doped is baked at 1000° C. to 1400° C. for several hours by using phosphate of alkali metal (sodium or potassium) as flux, particles having a particle size of several μm can be obtained.

EXAMPLES

Results of experiments of examples of the present invention will now be described.

The following manufacturing method was employed to prepare nano-size $Y_2O_3$: Eu, Zn fluorescent material particles. The process for preparing the nano-size $Y_2O_3$: Eu, Zn fluorescent material particles was as follows.

Initially, yttrium sulfate in a quantity of 0.02 mol, europium nitrate in a quantity of 0.0001 mol to 0.0009 mol and zinc acetate in a quantity of 0.0003 mol to 0.0007 mol were dissolved in distilled water so that the overall quantity was made to be 100 ml. Thus, mixed solution of yttrium (Y) ions, Eu ions and Zn ions was prepared.

Solution of sodium carbonate (0.3 mol/l) in a quantity of 100 ml was added to the mixed solution of yttrium ions, Eu ions and Zn ions, and then the solution was stirred for 10 minutes. The optimum quantities of europium nitrate and zinc acetate were 0.0008 mol and 0.0005 mol, respectively.

Then, a centrifugal separator was operated to perform a centrifugal separating operation at 3000 rpm for 30 minutes. Then, precipitate was dried at 80° C. for 24 hours by using air supply. Then, dry solids were pulverized so that basic yttrium carbonate activated with Eu and Zn which was the precursor was obtained. The obtained basic yttrium carbonate activated with Eu and Zn was identified by performing analysis of Fourier transformation infrared spectral (FT-IR). Results of the measurement were shown in FIG. 1.

The precursor was introduced into an electric furnace containing air, the temperature of which was 700° C. to 900° C. so as to rapidly heat the precursor. Then, the hot state was maintained for 15 hours to 120 hours. and then the precursor was taken. Then, the temperature was rapidly lowered (the quick beating and cooling method). The optimum temperature and duration were 900° C. and 30 minutes, respectively. With the foregoing process, preparation of particles of nano-size $Y_2O_3$ fluorescent material activated with Eu and Zn which had a particle size of 10 nm to 100 nm was permitted.

Figure 2:
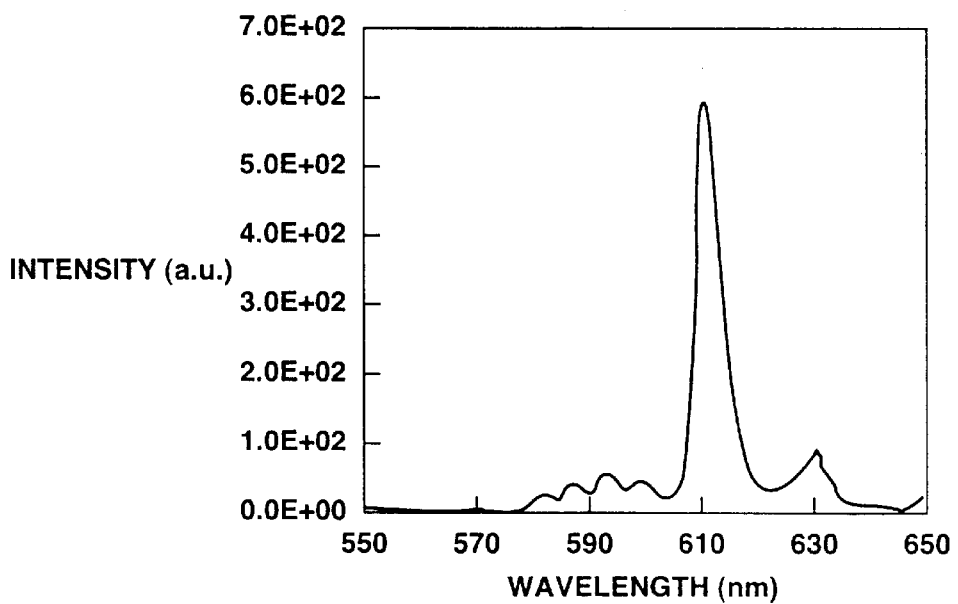
FIG. 2 is a graph showing emission spectrum realized by excitation of $Y_2O_3$:Eu, Zn nano-size fluorescent material particles with electron beams.

FIG. 2 shows emission spectrum realized by excitation of particles of $Y_2O_3$:Eu, Zn nano-size fluorescent material (having a mean particle size of 37 nm) with electron beams. Emission of red realized by $Eu^{3+}$ such that $^5D_0 \rightarrow {}^7F_2$ was observed at 611 nm.

Figure 3:
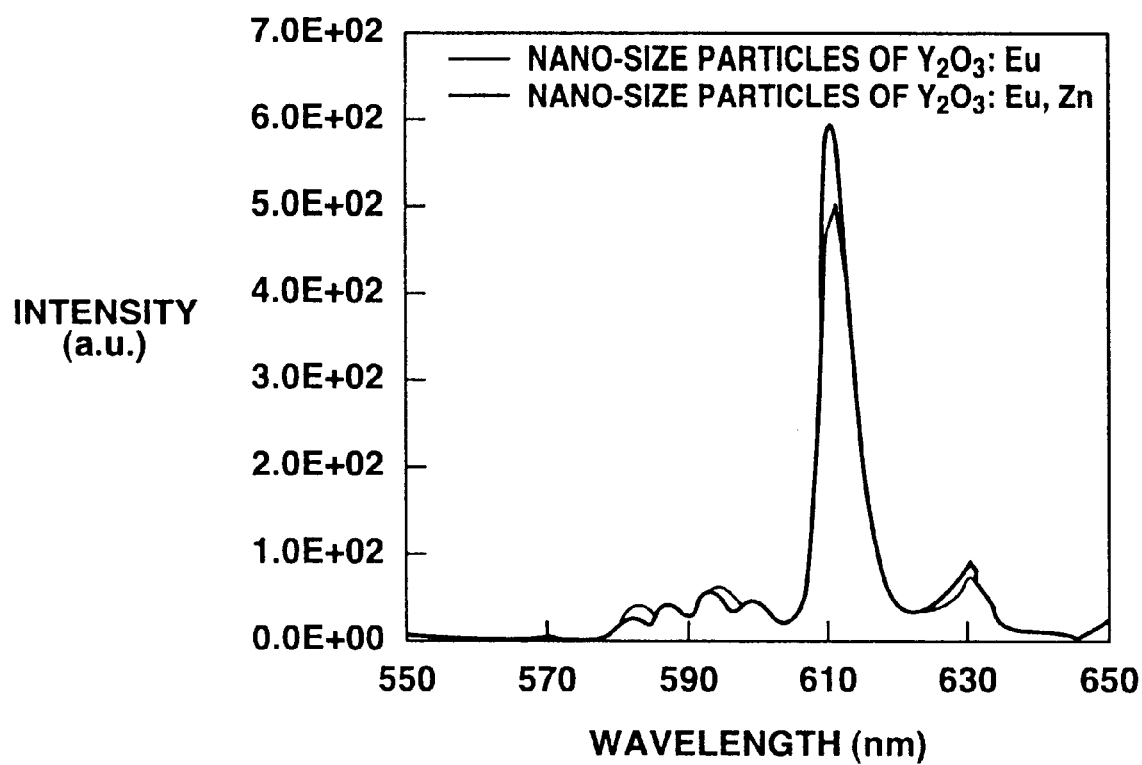
FIG. 3 is a graph showing a result of comparison between spectrums of nano-size particles of $Y_2O_3$:Eu fluorescent material and nano-size particles of $Y_2O_3$:Eu, Zn fluorescent material realized by excitation with electron beams.

Then, the brightness of nano-size particles of fluorescent material $Y_2O_3$:Eu obtained by adding only Eu and that of nano-size particles of fluorescent material $Y_2O_3$:Eu, Zn were measured. When Eu was added in a quantity not smaller than 0.0004 mol to nano-size particles of fluorescent material $Y_2O_3$:Eu containing no zinc added thereto, decrease in the brightness occurred due to concentration extinction. When Zn was added, addition of Eu by 0.0008 mol did not encounter decrease in the brightness. FIG. 3 is a graph showing a result of comparison between spectrums of nano-size particles of $Y_2O_3$:Eu fluorescent material and nano-size particles of $Y_2O_3$:Eu, Zn fluorescent material realized by excitation with electron beams. As can be understood from FIG. 3, the sample added with Zn resulted in a high intensity of emitted light having a wavelength of 611 nm. The brightness was raised by 5% to 10 %.

Then, the chromaticity of nano-size particles of $Y_2O_3$:Eu fluorescent material and that of nano-size particles of $Y_2O_3$:Eu, Zn fluorescent material were shown in Table 1.

TABLE 1

| Name of Sample | Chromaticity | |
|---|---|---|
| | x | y |
| $Y_2O_3$: Eu | 0.630 | 0.354 |
| $Y_2O_3$: Eu, Zn | 0.647 | 0.346 |

As can be understood from the table, the sample added with Zn realized intense color (deep chromaticity). Therefore, application of the present invention enables the intensity of color to be raised.

As described above, the method of manufacturing the fluorescent material according to the present invention and arranged to sodium carbonate enabled the precursor activated with Zn and Eu to easily be prepared. When the precursor was baked by the quick heating and cooling method, the nano particle size was realized. Since Zn was added, the problem of the unsatisfactory intensity of color was overcome. Moreover, the brightness was raised.

According to the present invention, the fine fluorescent material can be prepared which has the improved brightness and the nano-size. Thus, application to the FED and the precise CRT is permitted.

As described above, according to the present invention, a fluorescent material excellent in the intensity of color and brightness and suitable for the FED and the precise CRT can be provided.

The manufacturing method according to the present invention enables the precursor to easily be prepared. Moreover, a fine fluorescent material having the nano-size and micron-size can be prepared to meet a requirement.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A fluorescent material comprising:

a yttrium oxide fluorescent material activated with europium, wherein said yttrium oxide fluorescent material is co-activated with zinc.

2. A fluorescent material according to claim 1, wherein the mean particle size is 10 nm to 100 nm.

3. A method of manufacturing a fluorescent material comprising the steps of:

using basic yttrium carbonate activated with europium and zinc as a precursor; and baking said precursor to prepare a yttrium oxide fluorescent material activated with europium and zinc.

4. A method of manufacturing a fluorescent material according to claim 3, wherein said basic yttrium carbonate activated with europium and zinc is prepared by a liquid-phase reaction.

5. A method of manufacturing a fluorescent material according to claim 4, wherein yttrium nitrate, europium nitrate and zinc acetate are allowed to react in a solution together with sodium carbonate so that basic yttrium carbonate activated with europium and zinc is prepared.

6. A method of manufacturing a fluorescent material according to claim 3, wherein said basic yttrium carbonate activated with europium and zinc is baked by a rapid heating and cooling method to prevent undesirable particle growth.

7. A method of manufacturing a fluorescent material according to claim 3, wherein said basic yttrium carbonate activated with europium and zinc is baked together with flux.

8. A method of manufacturing a fluorescent material according to claim 7, wherein said flux is phosphate of alkali metal.

* * * * *